(12) United States Patent
Palanigounder et al.

(10) Patent No.: US 9,668,128 B2
(45) Date of Patent: May 30, 2017

(54) METHOD FOR AUTHENTICATION OF A REMOTE STATION USING A SECURE ELEMENT

(75) Inventors: Anand Palanigounder, San Diego, CA (US); Edward George Tiedemann, Jr., Concord, MA (US); John Wallace Nasielski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 13/213,401

(22) Filed: Aug. 19, 2011

(65) Prior Publication Data

US 2012/0233685 A1 Sep. 13, 2012

Related U.S. Application Data

(60) Provisional application No. 61/450,956, filed on Mar. 9, 2011.

(51) Int. Cl.
*G06F 9/00* (2006.01)
*H04W 12/06* (2009.01)
(Continued)

(52) U.S. Cl.
CPC ......... *H04W 12/06* (2013.01); *H04L 63/0823* (2013.01); *H04L 63/0853* (2013.01); *H04W 12/12* (2013.01)

(58) Field of Classification Search
None
See application file for complete search history.

(56) References Cited

U.S. PATENT DOCUMENTS 6,408,175 B1 6/2002 Park
6,804,506 B1 10/2004 Freitag et al.
(Continued)

FOREIGN PATENT DOCUMENTS

CN 1183202 A 5/1998
CN 1225226 A 8/1999
(Continued)

OTHER PUBLICATIONS

3GPP: "3rd Generation Partnership Project; Technical Specification Group Service and Systems Aspects: Security of H(e)NB; (Release 8)", 3GPP TR 33.820 V8.3.0, vol. 33.820, No. V8.3.0 Dec. 1, 2009 (Dec. 1, 2009), pp. 1-99, XP002650893, Retrieved from the Internet: URL:http://www.quintillion.co.jp/3GPP/Spec s/33820-830.pdf Sections 6 and 7.

(Continued)

*Primary Examiner* — Mohammed Waliullah
(74) *Attorney, Agent, or Firm* — Won Tae C. Kim

(57) ABSTRACT

Disclosed is a method for authentication of a remote station by a management station using a secure element. In the method, the remote station receives an identity request from the secure element. The identity request includes a first challenge provided to the secure element by the management station. The remote station forwards an identity response to the secure element. The identity response includes a response to the first challenge that is signed by a key of the remote station, and the signed response to the first challenge is for use by the management station to authenticate the remote station.

40 Claims, 3 Drawing Sheets

(51) Int. Cl.
*H04L 29/06* (2006.01)
*H04W 12/12* (2009.01)

(56) References Cited

U.S. PATENT DOCUMENTS

| | | | |
|---|---|---|---|
| 6,826,690 B1 | 11/2004 | Hind et al. | |
| 7,203,836 B1 | 4/2007 | Maringer et al. | |
| 7,325,133 B2* | 1/2008 | Fascenda | 713/168 |
| 7,769,175 B2 | 8/2010 | Bajar et al. | |
| 7,779,267 B2* | 8/2010 | Chen et al. | 713/185 |
| 7,937,750 B2* | 5/2011 | Mahalal et al. | 726/9 |
| 7,966,000 B2 | 6/2011 | Semple et al. | |
| 8,566,926 B1 | 10/2013 | Schnellbacher et al. | |
| 8,645,699 B2 | 2/2014 | Wood et al. | |
| 2002/0073229 A1* | 6/2002 | Hayashi | 709/237 |
| 2002/0091933 A1 | 7/2002 | Quick et al. | |
| 2004/0111616 A1 | 6/2004 | Adi | |
| 2004/0180657 A1* | 9/2004 | Yaqub et al. | 455/435.1 |
| 2006/0089123 A1 | 4/2006 | Frank | |
| 2006/0120531 A1* | 6/2006 | Semple et al. | 380/270 |
| 2006/0206710 A1 | 9/2006 | Gehrmann | |
| 2006/0236369 A1* | 10/2006 | Covington et al. | 726/1 |
| 2006/0291422 A1 | 12/2006 | Rochford | |
| 2007/0010242 A1 | 1/2007 | Blants et al. | |
| 2007/0016780 A1 | 1/2007 | Lee et al. | |
| 2007/0142086 A1 | 6/2007 | Boursier et al. | |
| 2008/0295159 A1* | 11/2008 | Sentinelli | 726/6 |
| 2008/0301776 A1 | 12/2008 | Weatherford | |
| 2009/0075584 A1 | 3/2009 | Jung et al. | |
| 2009/0172798 A1 | 7/2009 | Upp | |
| 2009/0217039 A1 | 8/2009 | Kurapati et al. | |
| 2009/0227234 A1 | 9/2009 | Bosch et al. | |
| 2009/0239503 A1 | 9/2009 | Smeets | |
| 2009/0249069 A1 | 10/2009 | Daskalopoulos et al. | |
| 2009/0258631 A1 | 10/2009 | Forsberg et al. | |
| 2009/0282256 A1 | 11/2009 | Rakic et al. | |
| 2010/0167740 A1 | 7/2010 | Vakil et al. | |
| 2010/0311419 A1 | 12/2010 | Bi | |
| 2010/0313024 A1 | 12/2010 | Weniger et al. | |
| 2010/0317405 A1 | 12/2010 | Keevill et al. | |
| 2011/0010543 A1 | 1/2011 | Schmidt et al. | |
| 2011/0086616 A1 | 4/2011 | Brand et al. | |
| 2011/0122813 A1 | 5/2011 | Choe et al. | |
| 2011/0219427 A1 | 9/2011 | Hito et al. | |
| 2011/0271330 A1 | 11/2011 | Zhang | |
| 2011/0314287 A1 | 12/2011 | Escott et al. | |
| 2012/0100832 A1 | 4/2012 | Mao et al. | |
| 2012/0144202 A1* | 6/2012 | Counterman | 713/176 |
| 2013/0036223 A1 | 2/2013 | Du et al. | |

FOREIGN PATENT DOCUMENTS

| | | | |
|---|---|---|---|
| CN | 1231108 A | 10/1999 | |
| CN | 1684411 A | 10/2005 | |
| CN | 1719919 A | 1/2006 | |
| CN | 101018174 A | 8/2007 | |
| CN | 101026453 A | 8/2007 | |
| CN | 101056456 A | 10/2007 | |
| CN | 101448257 A | 6/2009 | |
| CN | 101945386 A | 1/2011 | |
| EP | 1739903 A1 | 1/2007 | |
| EP | 2291015 A1 | 3/2011 | |
| JP | 2000510303 A | 8/2000 | |
| JP | 2002345041 A | 11/2002 | |
| JP | 2003535497 A | 11/2003 | |
| JP | 2004035538 A | 2/2004 | |
| JP | 2004297138 A | 10/2004 | |
| JP | 2005078220 A | 3/2005 | |
| JP | 2006245831 A | 9/2006 | |
| JP | 2007281861 A | 10/2007 | |
| JP | 2007336219 A | 12/2007 | |
| JP | 2008527905 A | 7/2008 | |
| JP | 2009188765 A | 8/2009 | |
| JP | 2009278388 A | 11/2009 | |
| KR | 20010102406 | 11/2001 | |
| KR | 20070003484 A | 1/2007 | |
| KR | 20100106543 A | 10/2010 | |
| WO | WO-9635304 A1 | 11/1996 | |
| WO | WO-9636194 A1 | 11/1996 | |
| WO | WO-9743866 A2 | 11/1997 | |
| WO | WO-0143108 A1 | 6/2001 | |
| WO | WO-0149058 A1 | 7/2001 | |
| WO | 2006024924 A1 | 3/2006 | |
| WO | 2007121190 | 10/2007 | |
| WO | WO-2009029156 A1 | 3/2009 | |
| WO | 2010039445 A2 | 4/2010 | |

OTHER PUBLICATIONS

Calhoun P., et al., "Diameter Base Protocol RFC 3588", Internet Engineering Task Force (IETF), Sep. 2003 (Sep. 2003), XP015009370.

Chen, et al., "A Secure Relay-Assisted Handover Protocol for Proxy Mobile IPv6 in 3GPP LTE Networks", Wireless Personal Communications, 2010.

Eronen P., et al., "Diameter Extensible Authentication RFC 4072", Internet Engineering Task Force (IETF) Aug. 2005 (Aug. 2005), XP015041927.

Funk P., et al., "Extensible Authentication Protocol Tunneled Transport Layer Security Authenticated Protocol Version 0 (EAP-TTLSv0); RFC 5281", Internet Engineering Task Force (IETF), Aug. 2008 (Aug. 2008), XP015060268.

International Search Report and Written Opinion—PCT/US2012/028611—ISA/EPO—May 23, 2012.

Simon D., et al., "The EAP-TLS Authentication Protocol; RFC 5216", Internet Engineering Task Force (IETF), Mar. 1, 2008 (Mar. 1, 2008), XP015055258.

Menezes A J., et al., Handbook of Applied Cryptography, CRC Press, 1997, pp. 403-405.

* cited by examiner

METHOD FOR AUTHENTICATION OF A REMOTE STATION USING A SECURE ELEMENT

CROSS-REFERENCE TO RELATED APPLICATION

This application claims the benefit of U.S. Provisional Application No. 61/450,956, filed Mar. 9, 2011, which application is incorporated herein by reference.

BACKGROUND

Field

The present invention relates generally to authentication of a remote station.

Background

A remote station may host user services provided by a wireless network operator. In GSM, UMTS, LTE and cdma2000 systems, the user services may be enabled using a smart card. An example of a smart card may be a Universal Integrated Circuit Card (UICC). The UICC may be removable, allowing it to be moved to another station or device. The wireless network operator may desire to authenticate the hosting remote station, without undue expense.

There is therefore a need for an effective technique for authenticating a remote station.

SUMMARY

An aspect of the present invention may reside in a method for authentication of a remote station by a management station using a secure element. In the method, the remote station receives an identity request from the secure element. The identity request includes a first challenge provided to the secure element by the management station. The remote station forwards an identity response to the secure element. The identity response includes a response to the first challenge that is signed by a key of the remote station. The signed response to the first challenge is for use by the management station to authenticate the remote station.

In more detailed aspects of the invention, the secure element may be a smartcard that is embedded in the remote station, a smartcard that is removable from the remote station, or a Trusted Processor Module built into the remote station. The remote station may be a wireless mobile device. The key of the remote station may be a private key that corresponds to a public key available to the management station, and the identity response may include a certificate that includes the public key. Alternatively, the key of the remote station may be a secret key shared by the management station. The identity response may include an identity value that is unique to the remote station. The first challenge may be a first nonce. Also, the identity response may include a second challenge generated by the remote station for use in authenticating the management station.

Another aspect of the invention may reside in a remote station which may include means for receiving an identity request from a secure element, the identity request including a first challenge provided to the secure element by a management station, and means for forwarding an identity response to the secure element, wherein the identity response includes a response to the first challenge that is signed by a key of the remote station, and wherein the signed response to the first challenge is for use by the management station to authenticate the remote station.

Another aspect of the invention may reside in a remote station which may include a processor configured to receive an identity request from a secure element, the identity request including a first challenge provided to the secure element by a management station, and to forward an identity response to the secure element, wherein the identity response includes a response to the first challenge that is signed by a key of the remote station, and wherein the signed response to the first challenge is for use by the management station to authenticate the remote station; and a memory configured to store the key of the remote station.

Another aspect of the invention may reside in a computer program product, comprising computer-readable storage medium, comprising code for causing a computer to receive an identity request from a secure element, the identity request including a first challenge provided to the secure element by a management station; and code for causing a computer to forward an identity response to the secure element, wherein the identity response includes a response to the first challenge that is signed by a key associated with the computer, and wherein the signed response to the first challenge is for use by the management station to authenticate the computer.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
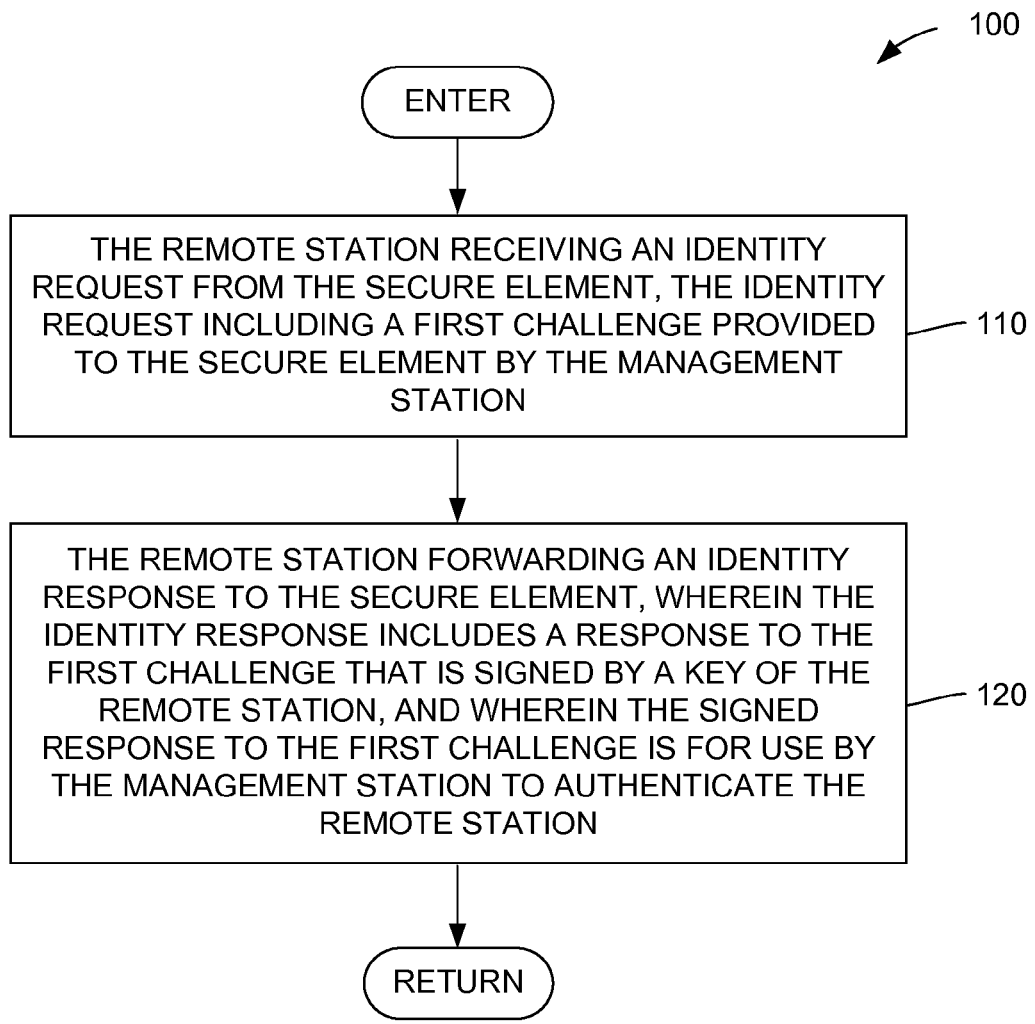
FIG. 1 is a flow diagram of a method for authentication of a remote station by a management station using a secure element, according to the present invention.
Figure 2:
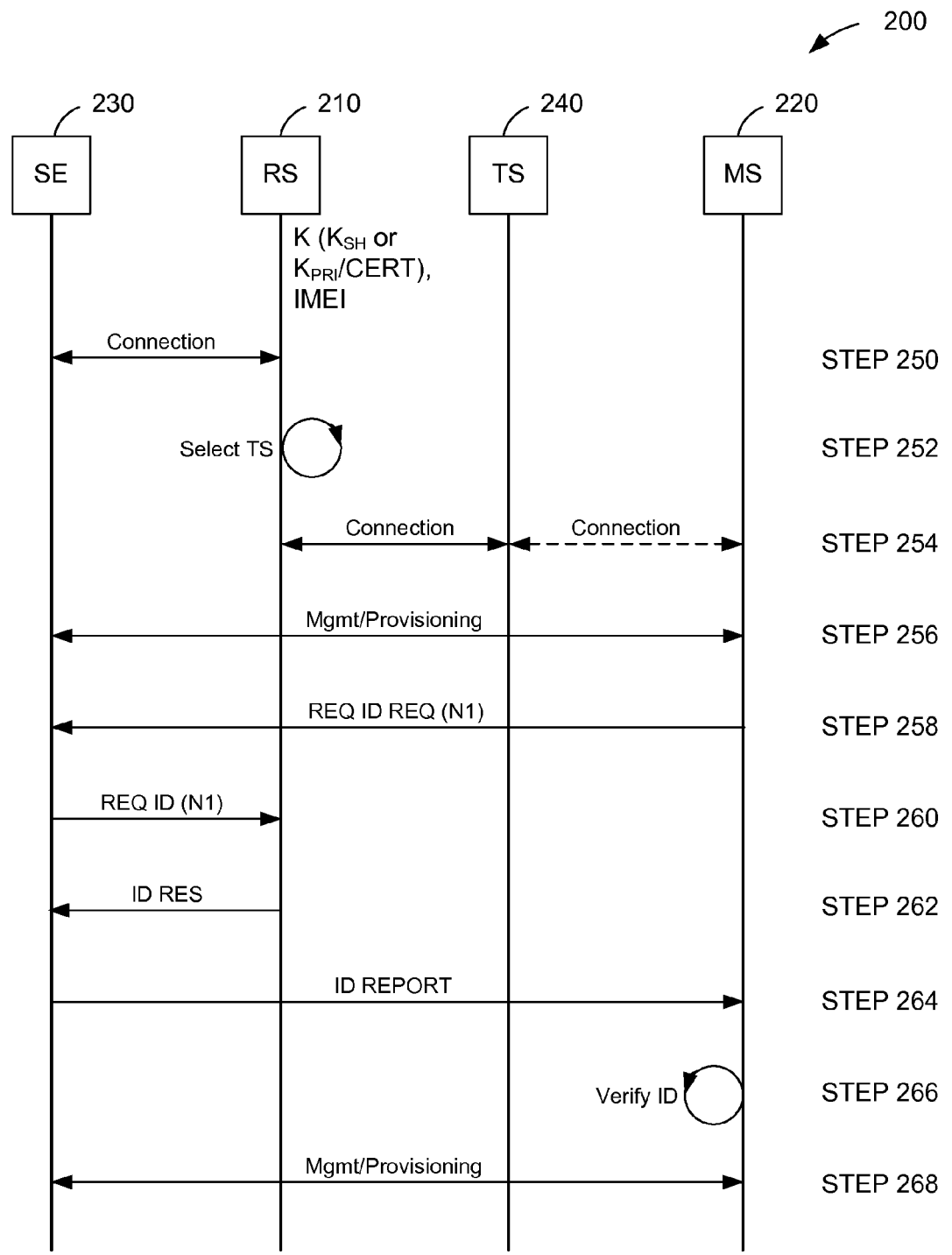
FIG. 2 is a flow diagram of a call flow for authentication of a remote station by a management station using a secure element.

With reference to FIGS. 1 and 2, an aspect of the present invention may reside in a method 100 for authentication of a remote station 210 by a management station 220 using a secure element 230. In the method, the remote station receives an identity request REQ ID from the secure element (step 110). The identity request includes a first challenge N1 provided to the secure element by the management station. The remote station forwards an identity response ID RES to the secure element (step 120). The identity response includes a response to the first challenge that is signed by a key K of the remote station. The signed response is for use by the management station to authenticate the remote station.

In more detailed aspects of the invention, the secure element 230 may be a smartcard that is embedded in the remote station 210, a smartcard that is removable from the remote station, or a Trusted Processor Module built into the remote station. The remote station may comprise a mobile user equipment (UE) such as a wireless device. The key K of the remote station may be a private key $K_{PRI}$ that corresponds to a public key available to the management station, and the identity response may include a certificate CERT that includes the public key. Alternatively, the key of the remote station may be a secret key $K_{SH}$ shared by the management station 220. The identity response may include an identity value that is unique to the remote station, such as an International Mobile Equipment Identity (IMEI) or Mobile Equipment Identity (MEID) or any other identity that uniquely always identifies the remote station. Other examples of such identities may include, but are not limited to, hardware identifiers assigned by IEEE such as EUI-48 or EUI-64 or assigned by the manufacturer of the remote station. The first challenge N1 may be a first nonce. Also, the identity response may include a second challenge, such as a second nonce, generated by the remote station for use in authenticating the management station.

Figure 3:
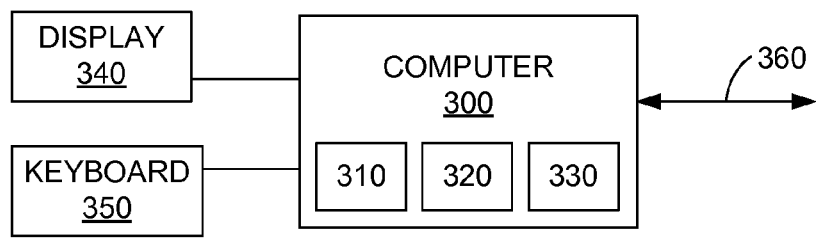
FIG. 3 is a block diagram of a computer including a processor and a memory.

With further reference to FIG. 3, another aspect of the invention may reside in a remote station 210 which may include means (processor 310) for receiving an identity request from a secure element, the identity request including a first challenge provided to the secure element by a management station, and means 310 for forwarding an identity response to the secure element, wherein the identity response includes a response to the first challenge that is signed by a key of the remote station, and wherein the signed response to the first challenge is for use by the management station to authenticate the remote station.

Another aspect of the invention may reside in a remote station 210 which may include a processor 310 configured to receive an identity request from a secure element, the identity request including a first challenge provided to the secure element by a management station, and to forward an identity response to the secure element, wherein the identity response includes a response to the first challenge that is signed by a key of the remote station, and wherein the signed response to the first challenge is for use by the management station to authenticate the remote station; and a memory configured to store the key of the remote station.

Another aspect of the invention may reside in a computer program product, comprising non-transitory computer-readable storage medium 320, comprising code for causing a computer 300 to receive an identity request from a secure element, the identity request including a first challenge provided to the secure element by a management station; and code for causing a computer to forward an identity response to the secure element, wherein the identity response includes a response to the first challenge that is signed by a key associated with the computer, and wherein the signed response to the first challenge is for use by the management station to authenticate the computer.

The remote station 210 or apparatus may comprise a computer 300 that includes, a processor 310, a storage medium 320 such as memory and/or disk drives, a secure module 330, a display 340, an input device such as a keyboard 350, a microphone, speaker(s), a camera, and the like. The station may include a wireless connection 360. Further, the station may also include USB, Ethernet and similar interfaces.

With reference again to FIG. 2, a high level call flow 200 shows procedures for host remote station authentication by the management station 220. The secure element 230 may be a smart card attached to the remote station 210, and provisioned with addresses for management station. The remote station may be a host module such as a mobile equipment with a secure storage and execution environment 330, e.g., a trusted environment (TrE) such as 3GPP TS 33.320. The remote station may be provisioned with device credentials such as an IMEI as the device identity, and a securely stored device private key or a shared secret key. The public key corresponding to the device private key may be accessible (for example, from a certificate CERT) to anyone wanting to verify a signature made using the device private key. If used, the shared secret key likewise would be securely stored by the management station. The management station may be a secure element manager that provides network access applications (NAAs) to the secure element. NAAs are used to obtain service from access networks such as wireless or wireline networks.

For example, the secure element 230 may be a smartcard (e.g., SIM, UICC/eUICC or R-UIM) or a Trusted Processor Module (TPM) that may not be customized with network operator data before deployment. It may be desirable for the smartcard or TPM to verify that it is attached to a certified and/or authorized host (cellular module/mobile equipment) before the smartcard or TPM is provisioned with network access credential information. Also, a network operator may want to periodically verify that the smartcard or TPM is still attached to the host remote station 210. For example, the network operator may want to prevent the pairing of a smartcard or TPM with another unauthorized host remote station for illicitly receiving network access, or for avoiding tracking by the network operator or government authorities. Using the smartcard or TPM may allow authentication of the host remote station without requiring changes to certain transport access network (i.e., LTE/UMTS, cdma2000 or other such wireless or even wireline access network) protocols.

The host remote device's identity may be any device identity that may be associated with the device's private/public key pair, or with the shared secret key. In addition to the IMEI, other examples may include an MEID, EUI-64, EUI-48, or any other unique device identity.

The management station 220 may be the entity that operates an over-the-air (OTA) management platform for the secure element 230. The secure element may use existing UICC/SIM card protocols specified by ETSI SCP/3GPP, or may use GlobalPlatform protocols or other suitable protocols.

In the call flow 200, the secure element 230 may open a connection with the remote station 210, and request the remote station to establish a transport connection with the management station 220 (step 250). The connection between the secure element and the remote station may be securely protected to prevent attack from an attacker inserted between the secure element and the remote station. The remote station selects a transport system 240 for establishing the transport connection with the management station (step 252). The transport system may be a wireless wide area access network WWAN (e.g., a cdma2000 or 3GPP access system such as GSM/GPRS/UMTS/LTE, etc.), a wireless local area network WLAN (e.g., an IEEE 802.11a/b/g/n wireless network), or a fixed IP service provided by a fixed network (e.g., PSTN, xDSL, Cable, Ethernet, Fiber, etc.). The transport connection may use IP or SMS or any such transport protocol. The transport connection is established (step 254). The secure element and the management station 220 may securely connect over the transport protocol for provisioning or management message exchanges (step 256). The messages transported between the secure element and the management station may be encrypted and integrity protected using, for example, authenticated HTTPS/TLS or SMS enhanced with encryption and/or integrity.

The management station 220 sends a request for a signed host remote station identity request REQ ID REQ to the secure element 230 (step 258). The request includes a nonce N1. The secure element sends a request for a signed host remote station identity, which includes the nonce N1, to the host remote station 210 (step 260). The remote station returns, to the secure element, a signed identity response ID RES that includes its identity (e.g., its IMEI), the nonce, and a signature (step 262). The signed identity response may further include a second nonce N2 as a challenge to authenticate the management station. The signature is for use by the management station for authenticating the remote station.

When using a private/public key pair, the remote station 210 hashes the message and encrypts it using the private key. The management station 220 decrypts the encrypted hash using the remote station's public key to authenticate the remote station (step 266). Message integrity is verified by re-hashing the received message and comparing it to the signature hash.

When using a shared secret key, the remote station 210 generates the signature (MAC) using the shared key (MAC=HMAC (shared key, message)). The management station 220 re-generates the signature (MAC) using the shared key, and compares it with the received MAC (step 266). The host remote station is then identified by the received identity.

After successful authentication of the host remote station 210, the management station 220 may then securely provision and activate the secure element 230 with NAAs or other credentials for providing services to the remote station (step 268). If the authentication of the host remote station fails, the management station may black list the remote station and not provision it with NAAs or other credentials information needed by the remote station to obtain service from a service provider. The management station may also instruct the secure element to disallow the use of network access credential information by the host remote station, if present on the secure element.

The management station 220 may periodically request host remote station authentication. For example, the management station may request authentication during an on-going management session. Alternatively, the management station may configure a policy in the secure element 230 to perform the authentication steps at the end of a configured time, upon detection of a change in the host remote station (e.g., a new device is paired), or upon every power-up of the host remote station.

Figure 4:
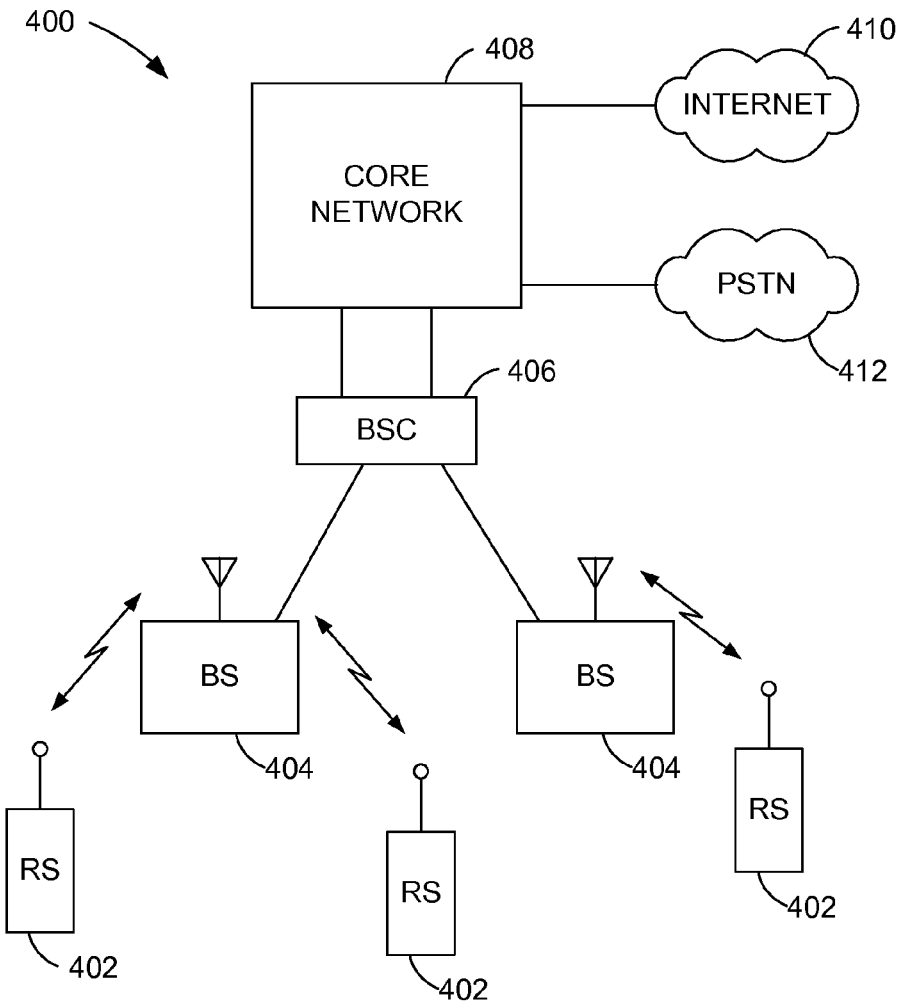
FIG. 4 is a block diagram of an example of a wireless communication system.

With reference to FIG. 4, a wireless remote station (RS) 402 (or UE) may communicate with one or more base stations (BS) 404 of a wireless communication system 400. The RS may further pair with a wireless peer device. The wireless communication system 400 may further include one or more base station controllers (BSC) 406, and a core network 408. Core network may be connected to an Internet 410 and a Public Switched Telephone Network (PSTN) 412 via suitable backhauls. A typical wireless mobile station may include a handheld phone, or a laptop computer. The wireless communication system 400 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for authentication of a remote station using a secure element, comprising:
   receiving, by the remote station, an identity request from the secure element, the identity request including a first challenge provided to the secure element by a management station; and
   forwarding, by the remote station, an identity response to the secure element, wherein the identity response includes a response to the first challenge that is signed by a key of the remote station, and wherein the signed response to the first challenge is for use by the management station to authenticate the remote station.

2. The method of claim 1, wherein the secure element is a smartcard that is embedded in the remote station.

3. The method of claim 1, wherein the secure element is a smartcard that is removable from the remote station.

4. The method of claim 1, wherein the secure element is a Trusted Processor Module built into the remote station.

5. The method of claim 1, wherein the remote station is a wireless mobile device.

6. The method of claim 1, wherein the key of the remote station is a private key that corresponds to a public key available to the management station.

7. The method of claim 6, wherein the identity response includes a certificate that includes the public key.

8. The method of claim 1, wherein the key of the remote station is a secret key shared by the management station.

9. The method of claim 1, wherein the identity response includes an identity value that is unique to the remote station.

10. The method of claim 1, wherein the first challenge is a first nonce.

11. The method of claim 1, wherein the identity response includes a second challenge generated by the remote station for use in authenticating the management station.

12. A remote station, comprising:
   means for receiving an identity request from a secure element, the identity request including a first challenge provided to the secure element by a management station; and
   means for forwarding an identity response to the secure element, wherein the identity response includes a response to the first challenge that is signed by a key of the remote station, and wherein the signed response to the first challenge is for use by the management station to authenticate the remote station.

13. The remote station of claim 12, wherein the secure element is a smartcard that is embedded in the remote station.

14. The remote station of claim 12, wherein the secure element is a smartcard that is removable from the remote station.

15. The remote station of claim 12, wherein the secure element is a Trusted Processor Module built into the remote station.

16. The remote station of claim 12, wherein the remote station is a wireless mobile device.

17. The remote station of claim 12, wherein the key of the remote station is a private key that corresponds to a public key available to the management station.

18. The remote station of claim 17, wherein the identity response includes a certificate that includes the public key.

19. The remote station of claim 12, wherein the key of the remote station is a secret key shared by the management station.

20. The remote station of claim 12, wherein the identity response includes an identity value that is unique to the remote station.

21. The remote station of claim 12, wherein the first challenge is a first nonce.

22. The remote station of claim 12, wherein the identity response includes a second challenge generated by the remote station for use in authenticating the management station.

23. A remote station, comprising:
   a processor configured to:
      receive an identity request from a secure element, the identity request including a first challenge provided to the secure element by a management station, and
      forward an identity response to the secure element, wherein the identity response includes a response to the first challenge that is signed by a key of the remote station, and wherein the signed response to the first challenge is for use by the management station to authenticate the remote station; and
   a memory configured to store the key of the remote station.

24. The remote station of claim 23, wherein the secure element is a smartcard that is embedded in the remote station.

25. The remote station of claim 23, wherein the secure element is a smartcard that is removable from the remote station.

26. The remote station of claim 23, wherein the secure element is a Trusted Processor Module built into the remote station.

27. The remote station of claim 23, wherein the remote station is a wireless mobile device.

28. The remote station of claim 23, wherein the key of the remote station is a private key that corresponds to a public key available to the management station.

29. The remote station of claim 28, wherein the identity response includes a certificate that includes the public key.

30. The remote station of claim 23, wherein the key of the remote station is a secret key shared by the management station.

31. The remote station of claim 23, wherein the identity response includes an identity value that is unique to the remote station.

32. The remote station of claim 23, wherein the first challenge is a first nonce.

33. The remote station of claim 23, wherein the identity response includes a second challenge generated by the remote station for use in authenticating the management station.

34. A non-transitory computer-readable medium, comprising:
- code for causing a computer to receive an identity request from a secure element, the identity request including a first challenge provided to the secure element by a management station; and
- code for causing a computer to forward an identity response to the secure element, wherein the identity response includes a response to the first challenge that is signed by a key associated with the computer, and wherein the signed response to the first challenge is for use by the management station to authenticate the computer.

35. The computer-readable medium of claim 34, wherein the secure element is a smartcard.

36. The computer-readable medium of claim 34, wherein the secure element is a removable smartcard.

37. The computer-readable medium of claim 34, wherein the secure element is a Trusted Processor Module.

38. The computer-readable medium of claim 34, wherein the key is a private key that corresponds to a public key available to the management station.

39. The computer-readable medium of claim 34, wherein the key is a secret key shared by the management station.

40. The computer-readable medium of claim 34, wherein the first challenge is a first nonce.

\* \* \* \* \*